United States Patent [19]

Erickson et al.

[11] Patent Number: 4,490,745
[45] Date of Patent: Dec. 25, 1984

[54] ILLUSION CREATING VISUAL DISPLAY DEVICE

[76] Inventors: Erick E. Erickson, 3912 Osceola, Chicago, Ill. 60634; Daniel A. Langlois, 345 Fullerton, Apt. 2504, Chicago, Ill. 60614

[21] Appl. No.: 402,143

[22] Filed: Jul. 26, 1982

[51] Int. Cl.³ .......................... G02B 1/00; H04N 5/64
[52] U.S. Cl. .................................. 358/250; 273/85 F; 273/85 G; 273/DIG. 28; 340/705; 350/144; 350/174; 358/89; 358/254
[58] Field of Search .................. 358/88, 89, 158, 250, 358/3, 253, 254, 255; 273/1 GC, 85 F, 85 G, DIG. 28; 340/705; 434/43, 44; 350/133, 132, 143, 144, 174

[56] References Cited

U.S. PATENT DOCUMENTS 4,306,768  12/1981  Egging ............................. 350/170

Primary Examiner—Howard W. Britton
Attorney, Agent, or Firm—McDermott, Will & Emery

[57] ABSTRACT

An optical viewing device for creating an illusory image from a light source such as a cathode ray tube which includes mirrors for viewing the light source along plural paths through separate filters to separate the viewed image into independently positionable images.

14 Claims, 4 Drawing Figures

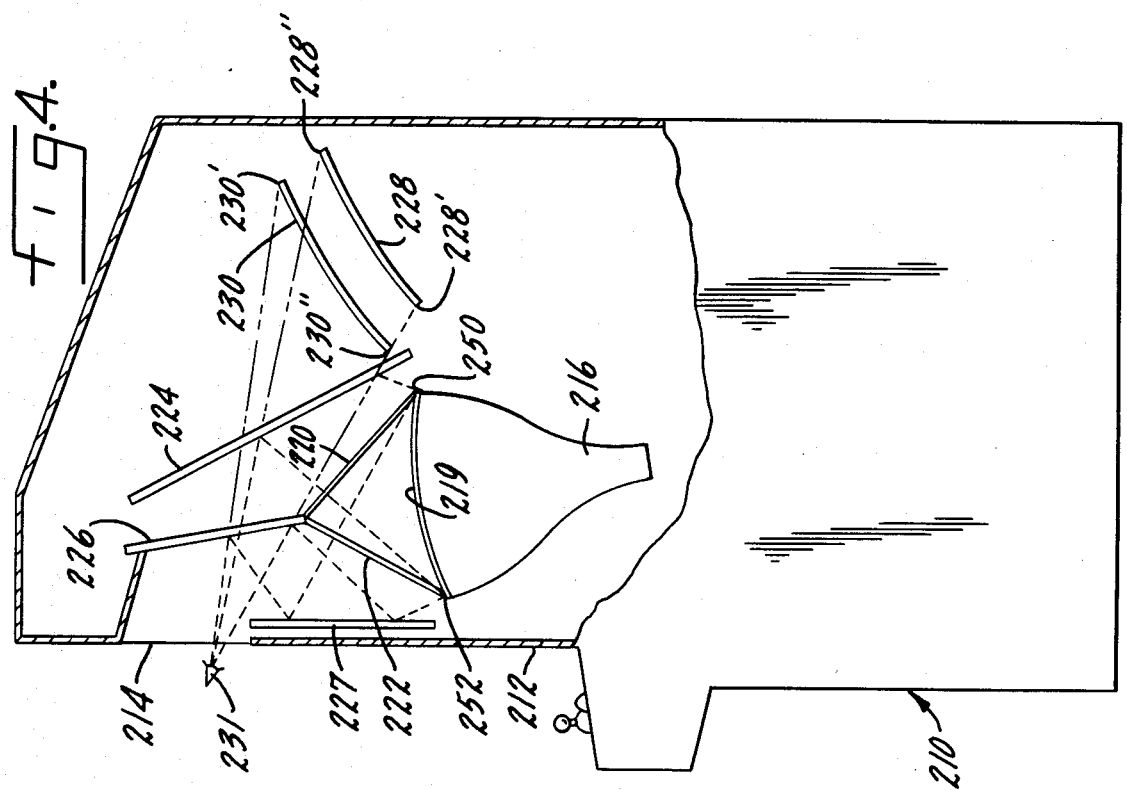
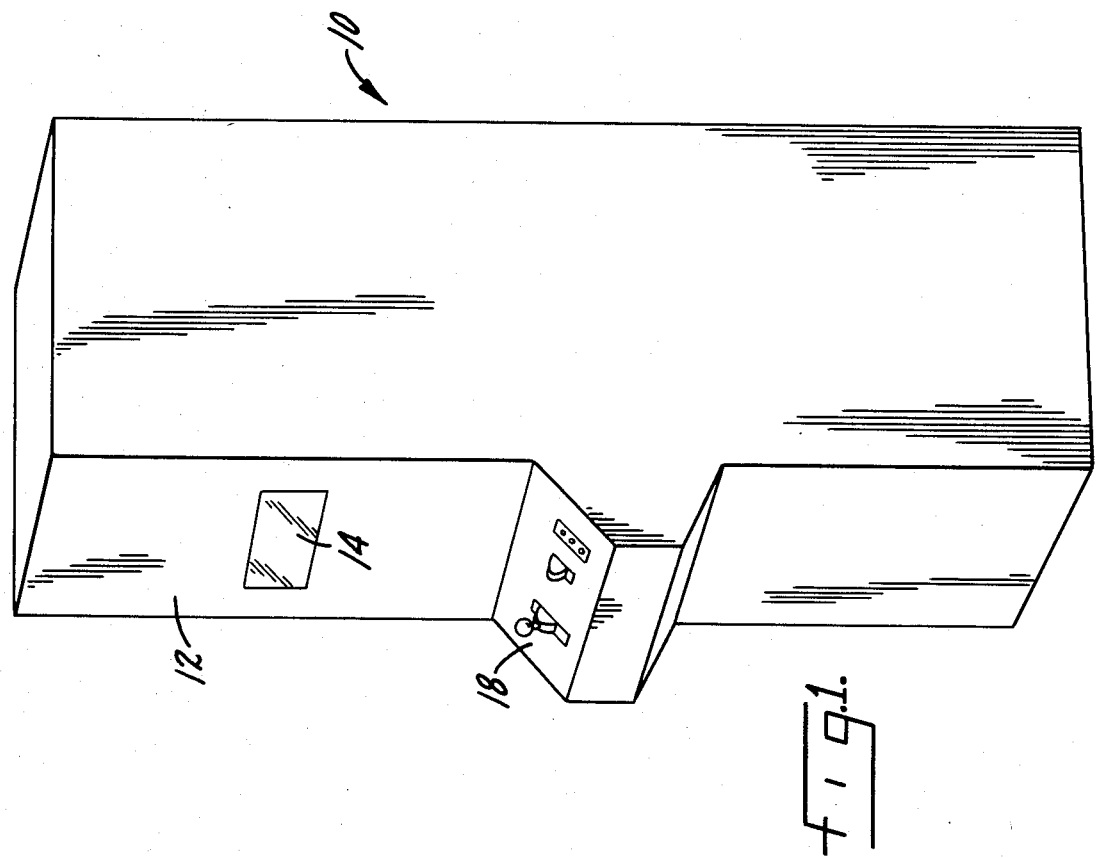

ILLUSION CREATING VISUAL DISPLAY DEVICE

BACKGROUND OF THE INVENTION

1. Field of the Invention

The present invention relates to an optical viewing device which creates an illusory image from a generally planar light source such as a cathode ray tube. More particularly, it relates to such a device which creates such illusions through prefiltered separation and selective reflection of light.

2. Description of the Prior Art

Video games commonly utilize light filters and mirrors to enhance the image perceived by the player. Mirrors, for example, are used to combine a video image with a three dimensional model or other stationary graphics. Such uses appear in the games "Space Invaders", manufactured by Midway Manufacturing, a division of Bally Electronics, Inc., and "Asteroids Deluxe", produced by Atari, Warner Communications, Inc.

Filters are often used to add color to black and white monitors. Examples include the game "Battlezone", produced by Atari, and "Starcastles", produced by Cinnetronics. None of these prior arrangements utilize separation of the light source into separate fields by prefiltering and independent direction of those fields by selective reflection.

Three dimensional images have been created in the past, for example, in "3-D" movies, through the use of selective filters incorporated in glasses worn by the viewer. Encoded signals are emitted from the light sources (projector) which are filtered by the lenses to allow one signal to be perceived by each eye of the viewer. The separate inputs so received are then combined by the brain to create a three dimensional illusion. This arrangement does not, however, actually provide separated fields which may be then separately directed for viewing by a viewer using both eyes.

SUMMARY OF THE PRESENT INVENTION

It is the primary object of the present invention to provide an improved form of optical viewing device which utilizes selective filtering and reflection of light to create an illusory image. A light source is separated into two directable fields by prefiltering, that is, filtering interposed between the source and the viewer. The separated fields are separately directed with the use of mirrors to a desired location of perceived image. Once separation by prefiltering is accomplished, any relative position is possible, dependent upon the positions and angles of the mirrors.

In one form, the light source is a typical three color cathode ray tube. Light signals which form the illusory image are emitted from the screen in predetermined colors, such as, red and blue. Red and blue light filters are disposed in the path of view. Viewing occurs through the use of mirrors which are disposed such that the field as viewed through the red filter is displaced with respect to the field as viewed through the blue filter. The signals so separated are thus perceived in separate viewing positions as desired. One image, for example, red, may be reflected to a planar location above the blue signal to create a three dimensional image perceived by the viewer with both eyes. Alternatively, red, for example, may be reflected to a location adjacent blue, to create an illusion of a field of view twice the actual size of the light source.

In another form of the invention, a polarizing mask and filters may be utilized to separate the light field for separate reflective positioning. A horizontal and vertical polarizing mask is affixed over the face of the cathode ray tube. Emitted light is thereby "coded" into separate "horizontal" and "vertical" waves. Horizontal and vertical polarized filters are positioned between the light source and the viewer and separate the source into two separate fields.

The field of the light source is viewed through the filters as reflected through one or more partially or totally reflective mirrors placed in predetermined positions to direct the separated fields to two distinct positions defined by the respective virtual images of the mirror. The position and angular relationship of the mirrors determine the relative position of the perceived images so separated. They may be placed, one above the other adjacent one another, or at any relative angle or spacing within the limits of permissible mirror position.

BRIEF DESCRIPTION OF THE DRAWINGS

FIG. 1 is a partially broken away perspective view of a device embodying the principles of the present invention.

FIG. 4 is a side elevational view, partially in section, of another modified form of the invention.

DETAILED DESCRIPTION OF THE PREFERRED EMBODIMENT

Figure 2:
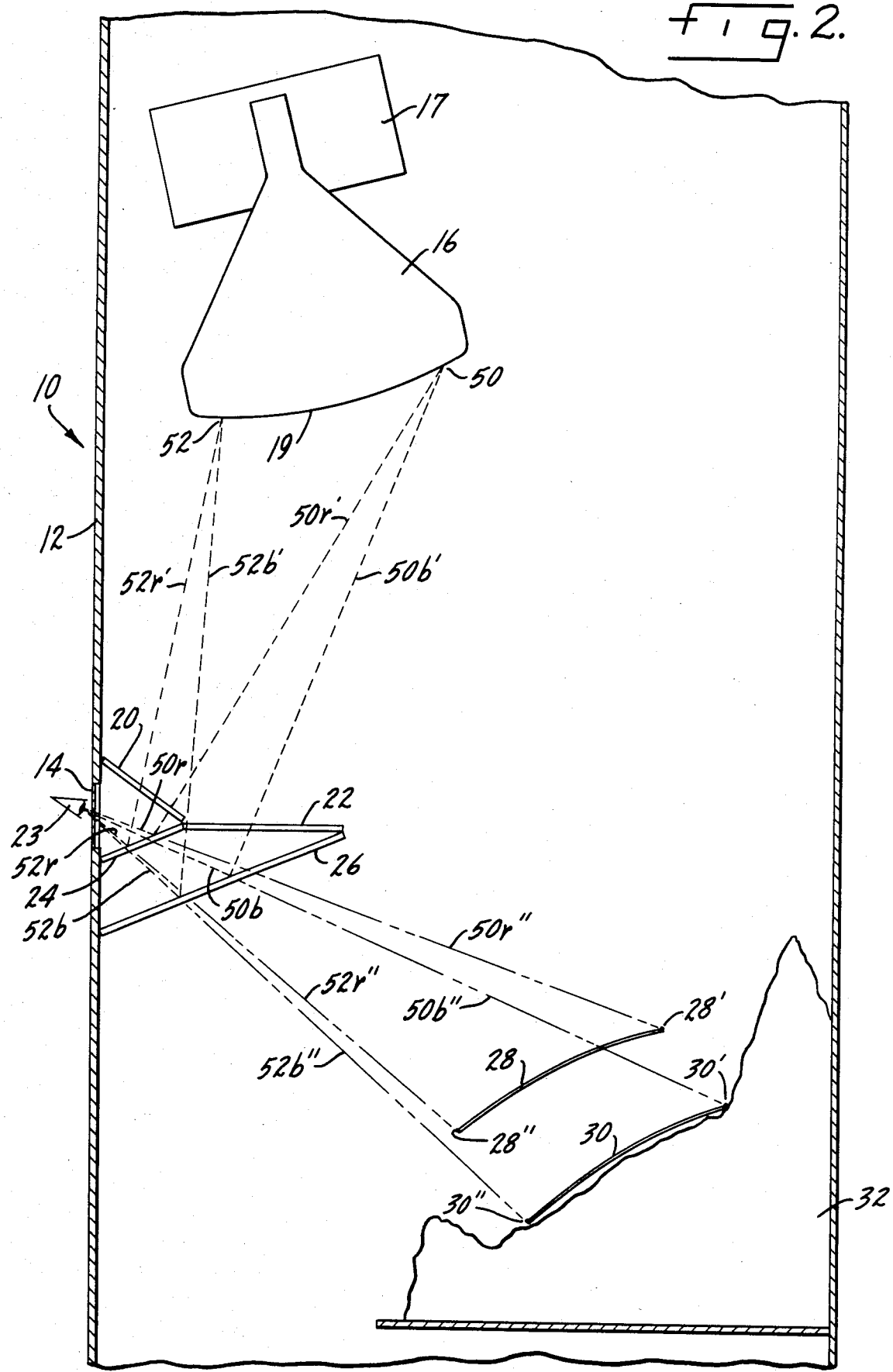
FIG. 2 is a side elevational view partially in section of an optical viewing device as in FIG. 1 illustrative of the principles of the present invention.

Turning now to the drawings, there is illustrated in FIGS. 1 and 2 an optical viewing device which embodies the principles of the present invention. The invention has ready application to video games, or the like, where the image perceived by a player typically emanates from a color television monitor or cathode ray tube. Alternatively, a preprogrammed signal or signal from an internal source may be displayed solely for the entertainment of viewing within the optical device. Other and varied applications are, however, readily apparent.

As best seen in FIG. 1, the optical viewing device includes a cabinet 10 which houses the optical apparatus and within which the illusory image is perceived. To this end, a wall 12 is provided with a window 14 which provides a visual access to the cabinet interior. Appropriate controls 18, which operate in a well-known manner through a microprocessor, may be provided to permit the viewer or user to manipulate, or otherwise affect the action perceived within the cabinet 10.

A cathode ray tube 16 of a monitor 17, capable of providing colored images, represents the light source. In the illustrated embodiment at least two color signals, for example, red and blue, are used to illuminate the screen 19.

Two filters, a red filter 20 and a blue filter 22, are interposed such that screen 19 can only be viewed through one or the other as will be explained. Such red and blue filters are commercially available. They may be obtained from Rosco, 36 Bush Avenue, Port Chester, New York 10573.

Red signals pass through the red filter but do not pass through the blue filter. Similarly, blue signals pass through the blue filter but do not pass through the red filter. Dependent upon the color of its illumination, and the filter through which it is viewed, a given point on the screen 19 will either be seen or not seen. The signals emitted from the light source are thus separated for ultimate imagery creation.

A pair of reflective mirrors 24 and 26 are disposed at appropriate positions to permit a viewer or user, diagrammatically represented as eye 23, to view the screen 19 through both filters 20 and 22. The mirror 24 is partially reflective. If fully reflective, a viewer could not perceive beyond it as is necessary in this embodiment. The mirror 26 in this embodiment is also partially reflective, preferably more reflective than mirror 24 since it must be viewed through mirror 24. The mirrors should be between 10 and 80 percent reflective. Preferably mirror 24 should be about 17 percent reflective and mirror 26 should be about 54 percent reflective.

The viewer or user, graphically illustrated at 23, may view the screen 19 through red filter 20 as it is reflected from mirror 24 and through blue filter 22 as it is reflected through mirror 26. As viewed through mirror 24, the field appears at virtual image 28. As viewed through mirror 26, it appears at virtual image 30.

Site lines are drawn in the illustrated embodiment of FIG. 2 to assist in understanding the inventive concept. Point 50 on screen 19 may be viewed through red filter 20 along site lines 50r and 50r'. If illuminated red, it is perceived at the virtual image 28 as point 28'.

Point 52 may be viewed along site lines 52r and 52r' and, if illuminated red, it is perceived at the virtual image 28 as point 28".

Point 50 may also be perceived through blue filter 22. If illuminated blue, it is perceived along site lines 50b and 50b' at virtual image 30 as point 30'. Point 52 may be viewed along site lines 52b and 52b' and, if illuminated blue, it is perceived at virtual image 30 as point 30". As is apparent, all other points on viewing surface 19 are similarly viewable through red and blue filters 20 and 22 and may be separately perceived at either virtual image 28 or 30, dependent upon color of illumination.

The particular distance of each point on the apparent images of surface 19 as viewed through separate mirrors 24 and 26 is determined by the distances from the reflective surface of the mirrors 24 and 26 to the surface of screen 19. Thus, the distance 50r" between the reflective surface of mirror 24 and point 28' is equal to the length of site line 50r'. Distance 52r" between the reflective surface of mirror 24 and point 28" is equal to the lengths of site line 52r'.

Points perceived in the virtual image of mirror 26 may similarly be determined. The distance 50b" to point 30' from the reflective surface of mirror 26 is equal to the length of site line 50b". Point 30" is perceived to be located a distance 52b" from surface of mirror 26 equal to the length of site line 52b'. Thus, by changing the relative positions of mirrors 24 and 26 with respect to the surface 19, the distance and relative position of virtual images 28 and 30 may be readily modified.

In the illustrated embodiment of FIGS. 1 and 2, the mirrors are set such that the virtual image 28 of mirror 24 is above the virtual image 30 of mirror 26 to create a three dimensional effect. As can be appreciated, the viewer may perceive the entire viewing surface 19 of the monitor 17 at two separate locations, one at position 28 and one at position 30. Further, the fields may present different indicia. They are first separated into two separately directable fields by the previewing filters 20 and 22. Virtual image 28 presents only light signals which pass through red filter 20 and image 30 presents only light signals which pass through blue filter 22.

The variety of uses of the present invention is readily apparent. Operator control of the images could provide the basis for a video game, for example, in which the images passed above and below, or next to each other. Or, a preprogrammed display could be used purely for its inherent entertainment value.

Myriad other uses for the above arrangement are readily apparent. It may be used as an educational tool, providing the viewer with the preprogrammed visual panorama eminating from a prerecorded video tape operatively connected to the input of the monitor 17. It may otherwise be utilized to create a multitude of imaginary effects for entertainment. The red signals may be, for example, in the form of birds, or planes, and the blue images, land animals or vehicles. To enhance the effect, the virtual images may be superimposed upon a model 32, formed of plaster or styrofoam or the like, designed to simulate a landscape or the like. In this latter case, both mirrors 26 and 28 will necessarily be semi-reflective in order that the model be viewed by the viewer.

To further add to the effect, violet signals may also be emitted from the light source 16. These will pass through both filters and be reflected by both semi-reflective mirrors. They will thus appear at both ultimate or virtual images.

Alternate illusions can be created merely by repositioning the mirrors to alter the location of the respective virtual images. The prefiltered fields, i.e., for example, red signals, could be reflected adjacent blue signals to provide a double wide image. The reflected prefiltered images would appear side-by-side creating an illusion of a field double the width of the actual field of the light source. Red illumination would appear on one, blue on the other. Violet signals would appear on both. It should also be appreciated that numerous other colors and color filters could be used to further enhance the effect.

Figure 3:
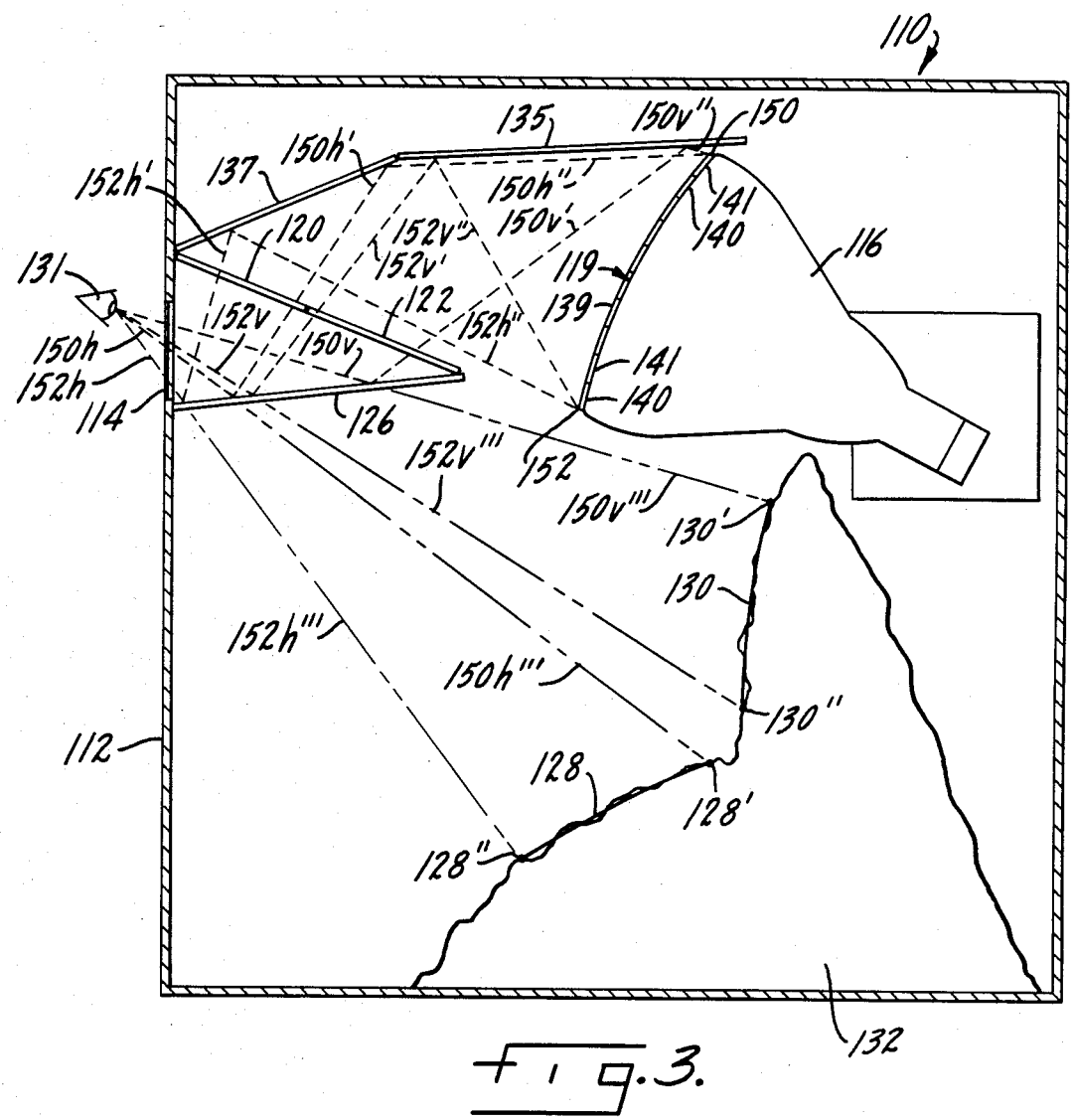
FIG. 3 is a side elevational view, partially in section, of a slightly modified form of the invention.

A modified form of the invention is illustrated in the embodiment of FIG. 3. A cabinet 110 includes a wall 112 having a viewing window 114. A cathode ray tube monitor 116 is disposed within the cabinet with viewing surface 119 facing toward the wall 112 and inclined upwardly at a slight angle. A pair of directional change mirrors 135 and 137 are positioned above the window 114 and are positioned with respect to the surface 119 so as to reflect light signals eminating from the surface 119 generally downwardly for purposes as will be explained. Significant, however, is that the mirrors 135 and 137 permit reduction in the overall height of the cabinet 110 as compared to the cabinet 10 of the embodiment of FIG. 1.

Overlying viewing surface 119 is a polarizing filter mask 139 which, in alternate sections, 140 and 141, respectively passes only horizontally and vertically polarized light signals. In the illustrated embodiment sections 140 and 141 of horizontal and vertical polarizing mask extend horizontally across the screen. However, any desired arrangement or pattern may be chosen to provide a desired effect or illusory image.

Interposed between the mask 139 and a viewer or user of the device illustrated as eye 131 are a pair of horizontal and vertical polarized filters 120 and 122. Filter 120 passes only light signals which eminate through the horizontal polarizing portions 140 of mask 139. Filter 122 passes only light signals which eminate through vertical polarizing portions of mask 139. Thus, prior to any possible viewing of the emitted light from surface 119 of monitor 116, the light is prefiltered and separated into two independent fields which may be then separately dealt with to achieve the desired illusion.

In this embodiment, light passing through both filters is viewed by viewer 131 in a single mirror 126 which is a 50 percent reflective mirror. Due, however, to the different angles of mirrors 135 and 137 with respect to the surface 119 of monitor 16, the light signals viewed through the horizontal and vertical polarized filters 120 and 122 will be perceived at two different virtual images. In the illustrated embodiment, the reflected image of screen 119 as viewed through horizontal polarizing filter 120 will appear as a generally horizontal or slightly included image 128 and the reflected image of screen 119, as viewed through vertical polarizing filter 122 will appear at nearly vertical virtual image 130.

Disregarding mask 139 for the moment, it can be appreciated that the entire screen 119 may be viewed through either polarized filter 120 or 122. Point 150, for example, may be viewed through vertical polarized filter 122 along site line 150$v$, 150$v'$ and 150$v''$. It would appear as point 130′ at virtual image 130. Similarly, point 152 may be viewed along site lines 152$v$, 152$v'$ and 152$v''$. It would appear at point 130″ on virtual image 130.

Point 150 may also be viewed through horizontal polarized filter 120 along site lines 150$h$, 150$h'$ and 150$h''$. It would appear as point 128′ of virtual image 128. Point 152 may be viewed through filter 120 along site lines 152$h$, 152$h'$ and 152$h''$. It would appear at point 128″ of virtual image 128.

As is apparent, all points upon screen 119 may be viewed through both the horizontal and vertical polarized filter 120 and 122. The respective position of the imaginary images 128 and 130 depend upon the distance from the surface of mirror 126 to each point as viewed through mirrors 135 and 137. For example, the distance represented by imaginary line 150$h'''$ between point 128′ and the reflecting surface of mirror 126 is equal to the combined total length of site lines 150$h'$ and 150$h''$. Similarly, the distance, represented by imaginary line 152$h'''$ from point 128″ to the reflecting surface of mirror 126 is equal to the sum total of the length of site lines 152$h'$ and 152$h''$. This is true of all points on screen 119 when perceived as image 128.

Similarly, the imaginary distance, 150$v'''$ between the reflective surface of mirror 126 and point 130′ viewed through vertical polarized filter 122 is equal to the sum total length of site lines 150$v'$ and 150$v''$. The distance, 152$v'''$ between the reflective surface of mirror 126 and point 130″ is equal to the combined total length of site lines 152$v'$ and 152$v''$. As can be appreciated, all points upon viewing surface 119 are capable of being placed upon both imaginary virtual images 128 and 130. Whether they appear there or not depends upon the configuration of mask 139.

In this latter regard, the polarizing mask and polarized filter arrangement differs somewhat from the red-blue filter arrangement of the embodiment of FIG. 2. There, a point, such as point 50 or point 52, or any other illuminated point upon surface 19 may be made to appear upon either virtual image 28 or 30 by illuminating the point with the appropriate red or blue color. This is easily controlled internally of the monitor in a well-known manner by a pre-programmed video tape or through operator control of an associated microprocessor. In the embodiment of FIG. 3, however, point 150 is masked with a vertical portion 141 of polarizing mask 139. Therefore, a signal at point 150 will only be seen along site lines 150$v$, 150$v'$ and 150$v''$ through vertical polarizing filter 122 and will only appear at virtual image 130. Point 152, on the other hand, is masked with a horizontal portion 140 of mask 139. It will, therefore, only be perceivable along site lines 152$h$, 152$h'$ and 152$h''$ upon virtual image 128. The result as described above will obtain with respect to all horizontally and vertically masked portions of the screen 119. Importantly, the mask may be rearranged or made to cover only a portion of screen to modify where and whether a given illuminated point on the surface of screen 119 may be viewed. Any unmasked portion will appear upon both virtual images. Also, the points need not be of any particular color light to be viewed, the mask, in combination will filter 120 and 122 controls what points are perceived by the viewer, and where they are viewed.

Mirror 126 is partially reflective in order that a model 132 be visable in association with the perceived virtual images 128 and 130. In the event a model is not utilized, mirror 126 could be totally reflective.

A further modified form of the invention is illustrated in FIG. 4. Again this embodiment incorporates prefiltering to create separable images from a single light source and mirrors to permit viewing of the light source along a separate path through each filter. Mirror positions relative to the light source and each other determine the position and spacing of the separated images.

A cabinet 210 includes a wall 212 provided with a viewing window 214. A cathode ray tube or television monitor 216 is disposed with a generally upwardly directed viewing surface or screen 219. Red filter 220 and blue filter 222, which extend across the entire screen 219, are disposed in a tent like position over the screen 219.

Mirrors 224, 226 and 227 are disposed such as to permit a view 231 to perceive the reflected image of screen 219 through both the red and blue filters 220 and 222. The screen 219 is viewed through red filter 220 as reflected in mirrors 224.

Illuminated light signals which will pass through a red filter 220 (such as red and violet) will be perceived at virtual image 228. Similarly, illuminated light signals which pass through blue filter 222 (such as blue and violet) will be viewed through mirror 226, or reflected from mirror 227 and will appear at virtual image 230.

Point 250 on screen 219, if illuminated red, will appear as point 228′ at virtual image 228. Point 252 will appear at point 228″. Similarly, point 250 appears as point 230′ on virtual image 230 and point 252 appears as point 230″. With the mirror arrangement of this embodiment, the image as viewed through one filter, is inverted as compared to the image as viewed through the other. This further amplifies the versatility of the illusory presentation which may be accomplished utilizing the principles of the present invention.

As illustrated by the site lines in FIG. 4, the image of screen 219 as viewed through mirror 224 and red filter 220, appears spaced from and below the image as viewed in mirror 226 from mirror 227 through blue filter 222. Red is generally a more intense signal and, hence, this arrangement is preferred since it must be viewed through mirror 226 as reflected in mirror 224. However, red, above blue, as in the embodiment of FIGS. 1 and 2, is equally suitable for most applications. Since no model is used in this embodiment to coact with virtual images 228 and 230, mirror 224 may be fully reflective.

Various features of the present invention have been shown and described in connection with the illustrated embodiments. Numerous modifications may be made without departing from the spirit and scope of the invention.

We claim:

1. An optical viewing device for producing an illusory image comprising:
   a cathode ray tube capable of emitting at least a first red and at least a second blue signal of light,
   a plurality of mirrors arranged such that said light source may be viewed along at least a first and at least a second separate reflected path wherein said first and second paths are of different lengths,
   a red filter means interposed in said first one of said paths capable of passing one of said separable signals,
   a blue filter means interposed in said second one of said paths capable of blocking said first one of said signals and passing the second said signals.

2. An optical viewing device as claimed in claim 1 wherein said cathode ray tube is provided with a polarizing mask for polarizing a portion of the light source into a polarized wave form and one of said filters is a polarized filter capable of passing only light signals so polarized and the other of said filters is a polarized filter capable of blocking light signals so polarized.

3. An optical viewing device as claimed in claim 2 wherein said mask includes portions which are horizontal polarizing portions capable of polarizing light into a horizontal wave form and portions which are vertical polarizing portions capable of polarizing light into a vertical wave form, said first filter is a horizontal polarized filter capable of passing light in only horizontally polarized wave form and the other of said filters is a vertical polarized filter capable of passing light only in vertically polarized wave form.

4. An optical viewing device for producing an illusory image comprising:
   a source of light signals capable of emitting at least a first and at least a second signal of light,
   a plurality of mirrors arranged such that said light source may be viewed along at least a first and at least a second separate reflected path,
   first filter means interposed in said first one of said paths capable of passing one of said separable signals,
   at least second filter means interposed in said second one of said paths capable of blocking said first one of said signals and passing the second said signals wherein the lengths of said viewing paths place the virtual image of the light signal as viewed along one path above and spaced from the virtual image of the light signal as viewed along the other path.

5. An optical viewing device as claimed in claim 4 wherein the lengths of said viewing paths place the virtual image of the light signal as viewed along one path adjacent and in the same plane with the virtual image as viewed along the other path.

6. An optical viewing device for producing an illusory image comprising:
   a source of light signals capable of emitting at least a first and at least a second signal of light,
   a plurality of mirrors arranged such that said light source may be viewed along at least a first and at least a second separate reflected path,
   first filter means interposed in said first one of said paths capable of passing one of said separable signals,
   at least second filter means interposed in said second one of said paths capable of blocking said first one of said signals and passing the second said signals wherein one of said paths of viewing includes reflection of said light source image to the viewer by one mirror and the other of said paths of viewing includes reflection of said light source image to the viewer by another mirror in which at least one of said mirrors is from about 15 to about 80 percent reflective.

7. An optical viewing device as claimed in claim 6 including two partially reflective mirrors wherein said partially reflective mirrors are respectively about 17 and 54 percent reflective.

8. An optical viewing device as claimed in claim 6 wherein a model is disposed such that it may be viewed through said partially reflective mirror with the virtual images of said separate paths coacting therewith.

9. An optical viewing device as claimed in claim 6 wherein said partially reflective mirror is disposed in the path of view to the other of said mirrors and said second mirror is viewed through said partially reflective mirror.

10. An optical viewing device as claimed in claim 9 wherein said mirror is partially reflective, and a model is disposed such that it may be viewed through said partially reflective mirrors, with the virtual images of said mirrors coacting therewith.

11. An optical viewing device for producing an illusory image comprising:
    a source of light signals capable of emitting at least a first and at least a second signal of light,
    a plurality of mirrors arranged such that said light source may be viewed along at least a first and at least a second separate reflected path,
    first filter means interposed in said first one of said paths capable of passing one of said separable signals,
    at least second filter means interposed in said second one of said paths capable of blocking said first one of said signals and passing the second said signals wherein said paths of viewing are reflected to the viewer by a single mirror, said light source, as viewed in one path, being reflected to said single mirror by a second mirror, said light source being reflected to said single mirror by a third mirror.

12. An optical viewing device as claimed in claim 11 wherein said single mirror is partially reflective.

13. An optical viewing device for producing an illusory image comprising:
    a source of light signals capable of emitting at least a first and at least a second signal of light,
    a plurality of mirrors arranged such that said light source may be viewed along at least a first and at least a second separate reflected path,
    first filter means interposed in said first one of said paths capable of passing one of said separable signals,
    at least second filter means interposed in said second one of said paths capable of blocking said first one of said signals and passing the second said signals wherein one of said paths includes a second mirror to reflect the light source image to the mirror in which the image is perceived by the viewer.

14. An optical viewing device as claimed in claim 13 wherein the mirrors of said path having a second mirror are arranged such that the image viewed along that path is inverted as compared to the image as viewed along the other path.

* * * * *